United States Patent [19]

Simons

[11] Patent Number: 4,978,652
[45] Date of Patent: Dec. 18, 1990

[54] METHOD OF MAKING A COLOR FILTER ARRAY ELEMENT USING A HEATED EMBOSSED SURFACE

[75] Inventor: Michael J. Simons, Middlesex, Great Britain

[73] Assignee: Eastman Kodak Company, Rochester, N.Y.

[21] Appl. No.: 408,580

[22] Filed: Sep. 18, 1989

[30] Foreign Application Priority Data

Oct. 18, 1988 [GB] United Kingdom ............... 8824365.4

[51] Int. Cl.$^5$ ....................... B41M 5/035; B41M 5/26
[52] U.S. Cl. ......................................... 503/227; 8/471; 156/234; 156/235; 350/311; 427/261; 427/265; 427/428
[58] Field of Search .................... 8/471; 156/230, 234, 156/235, 239, 240; 427/261, 265, 428; 503/227; 350/311

[56] References Cited

U.S. PATENT DOCUMENTS 4,081,277 3/1978 Brault et al. ........................ 503/227

FOREIGN PATENT DOCUMENTS 246334 5/1987 European Pat. Off. ............ 503/227

*Primary Examiner*—Bruce H. Hess
*Attorney, Agent, or Firm*—Harold E. Cole

[57] ABSTRACT

A method of making an array of a repeating mosaic pattern of colorants carried on a support using (a) a plurality of donor materials each comprising respectively a sublimable dye of a different color, and (b) a receiver element comprising a support having thereon a dye-receiving layer, wherein each donor material is in turn brought into face-to-face contact with the receiver and heated patternwise by contact with a heated embossed surface to transfer the desired pattern of dye to the dye-receiving layer.

7 Claims, No Drawings

METHOD OF MAKING A COLOR FILTER ARRAY ELEMENT USING A HEATED EMBOSSED SURFACE

This invention relates to a method of making a color filter array element by thermal transfer.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor-intensive steps, requires careful alignment, is time-consuming and very costly. Further details of this process are disclosed in U.S. Pat. No. 4,081,277.

In addition, a color filter array element to be used in a liquid crystal display device may have to undergo rather severe heating and treatment steps during manufacture. For example, a transparent electrode layer, such as indium tin oxide, is usually vacuum sputtered onto the color filter array element. This may take place at temperatures elevated as high as 200° C. for times which may be one hour or more. This is followed by coating with a thin alignment layer for the liquid crystals, such as a polyimide. Regardless of the alignment layer used, the surface finish of this layer in contact with the liquid crystals is very important and may require rubbing or may require curing for several hours at an elevated temperature. These treatment steps can be very harmful to many color filter array elements, especially those with a gelatin matrix.

Another method of obtaining a color filter array element for a liquid crystal display device is described in EPA No. 246,334. This method employs a porous membrane to contain the dyes which are transferred by heat under reduced pressure using a metal mask. There is a problem in that technique in obtaining sufficient sharpness of the image since the dyes have to transfer from the donor layer to the receiver layer through the air gap formed by the thickness of the metal mask.

It would be desirable to provide a method of making a high quality color filter array element having good sharpness and which can be obtained easily and at a lower price than those of the prior art.

These and other objects are achieved in accordance with this invention which comprises a method of making an array of a repeating mosaic pattern of colorants carried on a support using
 (a) a plurality of donor materials each comprising respectively a sublimable dye of a different color, and
 (b) a receiver element comprising a support having thereon a dye-receiving layer, wherein each donor material is in turn brought into face-to-face contact with the receiver and heated patternwise by contact with a heated embossed surface to transfer the desired pattern of dye to the dye-receiving layer.

In a preferred embodiment of the invention, the mosaic pattern consists of a set of red, green and blue additive primaries.

In another preferred embodiment of the invention, each area of primary color and each set of primary colors are separated from each other by an opaque area, e.g. black grid lines. This has been found to give improved color reproduction and reduce flare in the displayed image.

The size of the mosaic set is not critical since it depends on the viewing distance. In general, the individual pixels (mosaic elements) of the set are from about 50 to about 600 μm. They do not have to be of the same size.

In a preferred embodiment of the invention, the repeating mosaic pattern of dye to form the color filter array element consists of uniform, square, linear repeating areas, with one color diagonal displacement as follows:

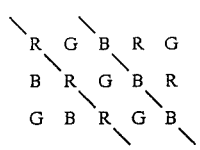

In another preferred embodiment, the above squares are approximately 100 μm.

As noted above, the color filter array elements of the invention are used in various display devices such as a liquid crystal display device. Such liquid crystal display devices are described, for example, in UK Patent Nos. 154,355; 2,130,781; 2,162,674 and 2,161,971.

The heated embossed surface is preferably applied to the back of the donor element while it is in contact with the receiver element.

The term "embossed surface" as used herein means a surface having a relief pattern on its surface. While the pattern could be formed by embossing, this is not the preferred method. Preferably the embossed surface may be made of copper or brass to which a layer of photoresist has been applied. The layer is then patternwise exposed and developed to provide a patterned resist. The metal sheet is then etched to provide the desired raised pattern. The embossed metal may be mounted on a heatable roller which preferably has a compliant layer immediately underneath the embossed layer to ensure better contact with the back of the donor sheet. Alternatively, a vacuum applied through the roller may be used to achieve good contact.

The successive dye donor sheets may be passed under the same embossed roller while adjusting the position of the laminate to ensure that the dyes are transferred to neighboring areas of the receiver, or a set of different embossed rollers may be employed.

The receiver comprises a support and a receiver layer. Such a layer may comprise a porous silica-containing layer, but preferably comprises a polymeric binder.

The polymeric binder employed in the receiving layer may comprise, for example, a polycarbonate, a polyurethane, a polyester, a polyvinyl chloride, a polyamide, a polystyrene, a polyacrylonitrile, a poly(caprolactone) or mixtures or copolymers thereof. The polymeric binder may be present in any amount which is effective for the intended purpose. In general, good results have been obtained at a concentration of from about 0.25 to about 5 g/m².

In another preferred embodiment, the polymeric binder employed in the receiving layer is cross-linked after transfer of the filter array image. This enables the color filter display to be more resistant to the rather severe heating and etching treatment steps which are generally necessary in forming a liquid crystal display device. Examples of such cross-linkable polymeric binders include polymers which may be cross linked by reaction with another substance present in or applied to the layer, such as epoxy resins (reacting with, for example, amines), unsaturated polyesters (using, for example, organic peroxides), phenolic resins (reacting with, for example, aldehydes), or polyurethanes (reacting with, for example, diisocyanates); and polymer systems which may be cross-linked on exposure to light, in the presence of photoinitiators or photosensitizers. Further details of such cross-linkable polymeric binders are found in application Ser. No. of Simons, entitled "Thermally-Transferred Color Filter Array Element," filed of even date herewith.

The support for the color filter array may be any transparent material such as polycarbonate, polyethylene terephthalate, cellulose acetate, polystyrene, etc. In a preferred embodiment the support is glass.

A dye-donor element that is used in the process of the invention to form the color filter array element comprises a support having thereon a dye layer. Any dye or mixture of dyes can be used in such a layer provided they are transferable to the dye image-receiving layer of the color array element of the invention by the action of heat. Especially good results have been obtained with sublimable dyes. Examples of sublimable dyes include anthraquinone dyes, e.g., Sumikalon Violet RS ® (Sumitomo Chemical Co., Ltd.), Dianix Fast Violet 3R FS ® (Mitsubishi Chemical Industries, Ltd.), and Kayalon Polyol Brilliant Blue N BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ® (Sumitomo Chemical Co., Ltd.), and Miktazol Black 5GH ® (Mitsui Toatsu Chemicals, Inc.); direct dyes such as Direct Dark Green B ® (Mitsubishi Chemical Industries, Ltd.) and Direct Brown M ® and Direct Fast Black D ® (Nippon Kayaku Co. Ltd.); acid dyes such as Kayanol Milling Cyanine 5R ® (Nippon Kayaku Co. Ltd.); basic dyes such as Sumicacryl Blue 6G ® (Sumitomo Chemical Co., Ltd.), and Aizen Malachite Green ® (Hodogaya Chemical Co., Ltd.);

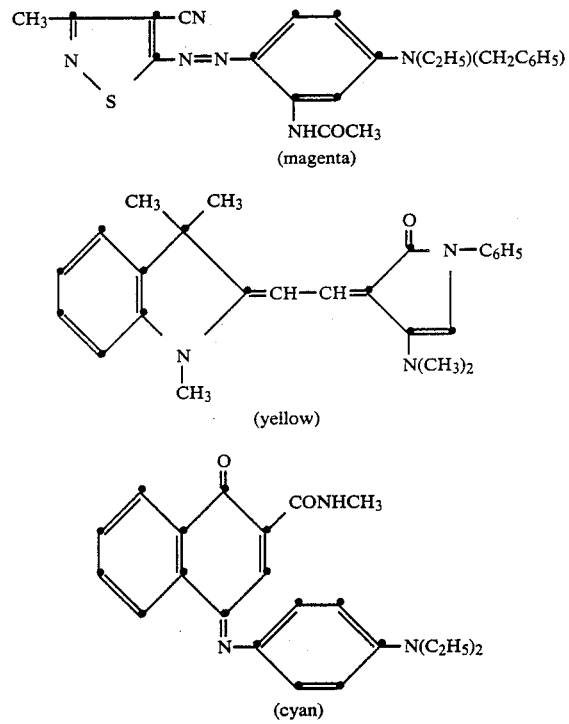

or any of the dyes disclosed in U.S. Pat. No. 4,541,830, the disclosure of which is hereby incorporated by reference. The above subtractive dyes may be employed in various combinations to obtain the desired red, blue and green additive primary colors. The dyes may be mixed within the dye layer or transferred sequentially if coated in separate dye layers. The dyes may be used at a coverage of from about 0.05 to about 1 g/m².

The dye in the dye-donor element is preferably dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m².

The dye layer of the dye-donor element may be coated on the support or printed thereon by a printing technique such as a gravure process.

Any material can be used as the support for the dye-donor element provided it is dimensionally stable and can withstand the heat of the thermal printing process. Such materials include polyesters such as poly(ethylene terephthalate); polyamides; polycarbonates; glassine paper; condenser paper; cellulose esters; fluorine polymers; polyethers; polyacetals; polyolefins; and polyimides. The support generally has a thickness of from about 2 to about 30 μm. It may also be coated with a subbing layer, if desired.

The dye-donor element employed in the invention may be used in sheet form or in a continuous roll or ribbon.

After the dyes are transferred to the receiver, the image may be treated to further diffuse the dye into the dye-receiving layer in order stabilize the image. This may be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

The following example is provided to illustrate the invention.

EXAMPLE

A dye-donor of alternating sequential areas of cyan, magenta and yellow dye was prepared by coating on a 6 μm poly(ethylene terephthalate) support:

(1) a subbing layer of a titanium alkoxide (duPont Tyzor TBT ®)(0.12 g/m²) from a n-propyl acetate and n-butyl alcohol solvent mixture, and (2) a dye layer containing the cyan dye illustrated above (0.28 g/m²), the magenta dye illustrated above (0.15 g/m²) or the yellow dye illustrated above (0.14 g/m²), and Micropowders, Inc. Fluo HT ® micronized polytetrifluoroethylene(0.05 g/m²), in a cellulose acetate propionate (2.5% acetyl, 45% propionyl) binder (0.25 0.32 g/m²) coated from a toluene, methanol and cyclopentanone solvent mixture.

On the rear of the dye-donor was coated:

(1) a subbing layer of a titanium alkoxide (duPont Tyzor TBT ®)(0.12 g/m²) from a n-propyl acetate and n-butyl alcohol solvent mixture, and (2) a slipping layer of Petrarch Systems PS513 ® amino terminated polysiloxane (0.001 g/m²); p-toluenesulfonic acid (2.5% of the wt. of the polysiloxane); Emralon 329 ® (Acheson Colloids Corp.) dry film lubricant of poly(tetrafluoroethylene) particles in a cellulose nitrate resin binder (0.54 g/m²); and BYK-320 ® (BYK Chemie, U.S.A.) copolymer of a polyalkylene oxide and a methyl alkylsiloxane (0.002 g/m²), coated from a n-propyl acetate, toluene, isopropyl alcohol and n-butyl alcohol solvent mixture.

An embossed copper roller was made by coating a thin sheet of copper with Kodak Micro Resist 747 ® photoresist, and the excess poured off so as to leave a thin film. It was then dried, exposed through a mask of the desired pattern, developed for about two minutes in Kodak Micro Resist ® developer, rinsed for 15 seconds in Kodak Micro Resist ® rinse, and then etched in a solution of 400 g/1 of $FeCl_3 \cdot 6H_2O$ to give an array of raised squares of 300 μm edge length. Each square touched the corner of the next square along one diagonal of the array, and was laterally separated from the adjacent raised square along the orthogonal axes of the array by 600 μm. The embossed copper sheet was fixed in contact with a curved aluminum heating block, radius 7 cm, and the block was maintained at 165° C.

A dye receiver was prepared by coating a glass plate with a thin layer of Geon 427 ® (B. F. Goodrich Company) vinyl chloride vinyl acetate copolymer (86:14). The solution was poured onto the glass plate, spread evenly, and then the surplus poured off. The resulting thin layer was allowed to dry, giving a clear, dry film of about 3 μm thick.

A filter array of cyan, magenta and yellow dyes was prepared by successively placing the cyan, magenta and yellow portions of the dye-donor described above in contact with the glass plate and rolling the plate and dye-donor element across the heated embossed roller at a speed of about 5mm per second.

It was seen that the raised portions of the roller caused squares of dye of approximately 300 μm edge length to transfer to the coated glass plate, forming an array of cyan, magenta and yellow squares. The dyes were then driven deeper into the receiving layer by an overall heating step.

The invention has been described in detail with particular reference to preferred embodiments thereof, but it will be understood that variations and modifications can be effected within the spirit and scope of the invention.

What is claimed is:

1. A method of making an array of a repeating mosaic pattern of colorants carried on a support using
   (a) a plurality of donor materials each comprising respectively a sublimable dye of a different color, and
   (b) a receiver element comprising a support 10 having thereon a dye-receiving layer, wherein each donor material is in turn brought into face-to-face contact with the receiver and heated patternwise by contact with a heated embossed surface to transfer the desired pattern of dye to the receiver layer.

2. The method of claim 1 in which the receiver layer comprises silica or a polymeric layer.

3. The method of claim 1 in which there are three donor materials which provide the mosaic pattern in the additive primary colors red, green and blue.

4. The method of claim 1 in which the embossed surface is of brass or copper.

5. The method of claim 4 in which the embossed surface is formed by etching a brass or copper sheet bearing a patterned resist image.

6. The method of claim 1 in which the embossed surface is mounted on a heated roller.

7. The method of claim 1 in which the heated embossed surface is applied to the back of the donor material while it is in contact with the receiver element.

* * * * *